Aug. 18, 1959   D. G. ROGERS   2,900,579
TANTALUM WIRE CAPACITORS
Filed Oct. 4, 1954

INVENTOR.
DONALD G. ROGERS
BY
HIS ATTORNEYS

United States Patent Office 2,900,579
Patented Aug. 18, 1959

2,900,579

TANTALUM WIRE CAPACITORS

Donald G. Rogers, Pownal, Vt., assignor to Sprague Electric Company, North Adams, Mass., a corporation of Massachusetts Application October 4, 1954, Serial No. 460,074

3 Claims. (Cl. 317—230)

This invention relates to miniature capacitors, more particularly to such capacitors that are sufficiently small to be conveniently used in miniature electrolytic structures such as the present day hearing aids.

Among the objects of this invention is the provision of a miniature capacitor which has an unusually high capacitance for its bulk.

An additional object of the present invention is to provide a tantalum type of electrolytic capacitor of miniature size and relatively inexpensive construction.

Figure 1:
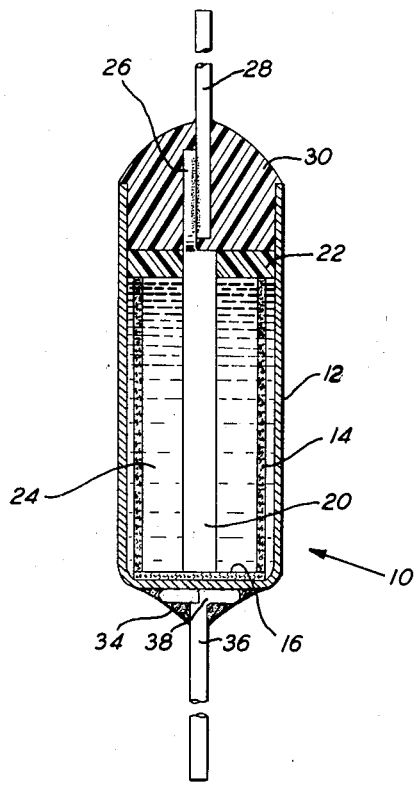
Figure 2:
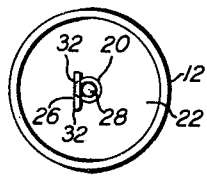

The above, as well as still further advantages of the present invention, will be more clearly understood from the following description of several of its exemplifications, reference being made to the accompanying drawings in which:

Fig. 1 is a vertical sectional view of a capacitor according to the present invention; and Fig. 2 is a top view of the capacitor of Fig. 1 with some of the outer structure removed in the interest of clarity.

It has been discovered that a very useful form of miniature capacitor can be made by using as an anode electrode, a short straight length of tantalum wire inserted in an electrolyte-containing can. The wire, as well as the can, need be no longer than about ½ inch, and the diameter of the can can be approximately ⅛ inch or even less.

By way of example such a capacitor can have a straight length of tantalum wire to one end of which is welded a flexible metal wire lead, substantially the entire balance of the wire being inserted in an electrolytic capacitor electrolyte held in a metal can, the inserted portion of the tantalum having an etched surface and being no more than about ½ inch long, and the welded joint being sealed to the open end of the can by insulating resin. With this type of etching it is preferred to use tantalum wire having a thickness of about 10 to 50 mils, of circular, square, oval or other cross-section.

The etching of the tantalum can be accomplished in the manner described in the copending Robinson application Serial No. 338,139, filed February 20, 1953.

For the miniature capacitor of the present invention, improved operation can be obtained if the anode, either etched or unetched, cooperates with a cathode surface that is roughened as by grit blasting, etching, depositing minute particles of conducting substances, rolling between rough rollers or the like. This roughening is, however, much more effective with the etched type of anode.

The very minimum amount of the fairly expensive tantalum metal can be used according to the present invention by having the anode wire flattened where it emerges from the electrolyte, with a flexible metal wire lead welded to the flattened portion. The welded joint is preferably at least partially embedded in the resin seal to improve its resistance to mechanical handling.

Referring now to the drawings, Fig. 1 shows a capacitor 10 having an outer tubular can 12 of silver. Within the can is a spacer structure in the form of a paper tube 14, and a paper disc 16 cooperating to cover the inner surfaces of said can. A straight tantalum wire 20 has one end placed against the spacer disc 16 and its other end filled with an encircling resin gasket 22 that can be pushed into the can. The paper tube 14 is short enough to permit the gasket 22 to so enter the can and leave above it at least a millimeter or so of height to receive and anchor a plastic seal 30.

Before the tantalum wire is inserted in the can, an electrolytic capacitor electrolyte 24 such as an 8 molar solution of lithium chloride in water can be placed in it, and the outer end of the wire flattened as shown at 26. Also before insertion of the anode, a flexible wire lead 28 of nickel for example, can have its end welded to the flattened portion 16, preferably by a spot weld.

The flattening of end 26 can also be used to make the flattened end project somewhat beyond the outlines of the unflattened portion of the wire as shown at 32, 32 in Fig. 2, which illustrates the capacitor with the resin seal 30 omitted. After the assembly of the welded wires 28, 20, with the gasket 22 fitted in place, this assembly is inserted into the can, the projections 32, 32 keeping the gasket from slipping back onto or past the welded joint. Prior to this, a flexible tube of resin can be slipped onto the welded wire 28. This functions to prevent stress concentration at the emergence site of the wire from the resin seal 30. The resin seal 30 can then be applied, as by filling the upper end of the can 10 with a flowable resin composition which can then be hardened to securely hold the assembly in place.

To the outside of the blind end of can 10 there is shown fastened as by solder 34 another lead wire 36. The soldered end of this wire can be looped as indicated at 38 to provide a larger area of contact with the can, as well as an enlarged head under the solder.

When made in the above manner, a condenser having a cam somewhat shorter than ½ inch long and having a ⅛ inch outer diameter with a wall thickness of about 5 mils and fitted with a straight tantalum wire 25 mils in diameter provides with an 8 molar lithium chloride electrolyte, a capacitance of 4 microfarads at an operating potential of 4 volts, when the wire had been anodically etched for 65 minutes in a stirred anhydrous solution of 100 grams of potassium heptafluorobutyrate in one liter of n-butanol at 65° C. with an anodic current density of ⅛ ampere per square inch, using two stainless steel cathodes, one on each side of the wire and 4.5 inches apart. During the etching the temperature can be permitted to increase to 80° C. When starting with a fresh etching solution, it is advisable to anodically treat tantalum for about 300 ampere-minutes before beginning the desired etch. Scrap tantalum can be used for this treatment. In this particular example the etched wire before assembly was preformed with an oxide coating by anodic oxidation in a 10% solution of phosphoric acid (by volume) in water, at an inter-electrode potential of 7 volts for a period of thirty minutes. Without the etching step the capacitor has a capacitance of about 0.3 microfarad at the same operating potential.

Where the tantalum is not absolutely clean before the etching, it is advantageous to carefully clean it particularly with a degreasing operation as by immersing it in a boiling aqueous solution of dispersing agent such as sodium lauryl sulfate having a concentration of about 2 ounces per gallon of water.

Instead of the specific etchant described above, any other soluble salt of a perfluorinated aliphatic acid having up to 6 carbon atoms per molecule can be used as described in the above-identified copending application, using any of the solvents there shown. In fact, salts of aliphatic acids in which only ½ the hydrogen is replaced by fluorine will also be suitable. Etching can also be effected in aqueous solutions of hydrofluoric acid containing chloride ions, or other ions that produce the desired complex film formation as disclosed in copending Kahan application, Serial No. 329,150, filed December 31, 1952, and now Patent No. 2,775,553.

When using salts of acids having relatively low boiling points, it is desirable to take into consideration the gradual volatilization of some of the acid during the etching treatment. Accordingly, small amounts of free acid can be added from time to time, or the etching temperature reduced. If desired, the etching can be carried out in a sealed container so that none of the material is lost. The etching temperature can be varied from about 20° C. to the boiling point of the etching bath, the timing being correspondingly adjusted to obtain the desired degree of etching. Very slight or no etching can be used where the capacitances desired in the final assembly are not very large. In addition, current densities of from 0.01 to about 1 ampere per square inch of anode can be used.

Instead of separately etching the independent anodes, an extended length of tantalum wire sufficient to make as many as 20 or more anodes can be etched and subsequently cut into the independent lengths and shaped as indicated in the figures. Furthermore, the wire can be arranged to be etched in endless lengths on a continuous or semicontinuous basis followed by the cutting and deforming. The etched wire generally is grit-blasted at the weld area to present a suitable surface for welding.

The etched or unetched wire does not have to be given any separate forming treatment since it will operate effectively under the desired conditions, the first few minutes of operation being sufficient to bring it to stable operating characteristics. Where a separate anodizing step is used, any of the standard tantalum forming treatments are satisfactory. Aqueous sulphuric acid, oxalic acid, or phosphoric acid solutions made good anodizing electrolytes, for example, 10% by volume of phosphoric acid in water.

Where an etching operation is carried out, the etching bath shows a tendency to pick up moisture particularly if maintained at a relatively low temperature. After a few percent of moisture is introduced in this way the etching bath will also cause anodizing to take place so that the single treatment will provide both the etching and the oxide formation. However, the water-containing bath will not be suitable for further etching until the water is removed as by adding to the bath silica gel or other suitable agents which need not even be permitted to settle out. The tantalum wire can also be formed as by heating to a temperature of about 2000° C. for one to two minutes in an oxidizing atmosphere such as ordinary air. For this heating, it is only necessary to pass an electric current through the wire.

The electrolyte 24 used in the final capacitor can be of any desired type. Although aqueous lithium chloride is described above, aqueous sulphuric acid, aqueous phosphorous acid or even non-aqueous solutions of the types described in the copending applications, Serial No. 287,316, filed May 12, 1952, now Patent No. 2,759,132, Serial No. 322,830, filed November 26, 1952, and Serial No. 355,159, filed May 14, 1953, and now abandoned, are suitable. Application Serial No. 322,830 has now been abandoned, but its subject matter has been carried forward to application Serial No. 537,812, filed September 30, 1955.

The can 12 can be of any material that does not interfere with the operation of the capacitor. Inert metals such as the noble metals, silver, gold and the platinum metals are preferred although stainless steel can be used. The wall thickness of the can can be made extremely small, as little as six mils, inasmuch as the resin seal 30 provides the desired resistance against crushing. The seal can be of any type of resin preferably one that adheres well to the metal of the can. An unfilled epoxy type resin such as those described in the article by Narracott on pages 341 to 345 of the October 1951 issue of British Plastics is exceptionally effective although ordinary phenolic resins or any thermoplastic resin that will not soften at the maximum operating temperature of the capacitor can also be used. Cross-linked polystyrenes or styrene copolymers, or cross-linked polyesters of unsaturated acids are also suitable. Although not essential it is preferred that the resin can be cured without the application of molding pressures.

The gasket 22 can be of any construction resistant to the action of the electrolyte. Even cardboard will be suitable for this purpose unless strong sulphuric acid is the electrolyte.

The metal can 12 can be directly used as one of the electrodes of the capacitor in which case the second terminal lead 36 can be omitted. On the other hand either or both leads can be modified so as to have plug-in outer ends or can be varied in position. When silver is used for the material of the can 12, the negative lead is very simply soldered to it using the conventional lead-tin solder. Where aluminum or other metal is used for the can, it can carry a plating of solderable metal to which the negative lead is soldered. Alternatively aluminum type solders (alloys of aluminum and tin) can be used to directly solder a copper wire or tab to an aluminum can. The lead can also be welded to the can preferably before the unit is assembled.

The porous spacers 14, 16 can be of any composition such as resin or felted or woven fibers of glass in place of the paper.

A feature of the present invention is the use of the minimum amount of expensive tantalum, in a construction in which the welding of the anode lead will not fail. The embedding of this weld in the sealing resin provides an additional margin of strength against the strains of manipulation and at the same time keeps the tantalum from working loose in the can. To help anchor the tantalum in place, the free end is placed directly against spacer disc 16 inasmuch as this appears to even further keep this free end from lateral movement when the lead 28 is violently bent.

The plain butt welding of the outer end of the tantalum anode to the anode lead 28, as shown for example in the Hall et al. article, "Miniaturizing the Tantalum Capacitor," appearing in the December 1950 issue of Electrical Manufacturing, pages 82 through 85, is not as satisfactory as the above-described weld. The butt weld is more difficult to provide and is susceptible to early failure when it uses tantalum wire as short as shown above for the present invention. Butt welding difficulties are heightened when the tantalum wire is appreciably thicker than lead 28, as illustrated. The desired capacitor compactness calls for fairly thick tantalum and leads that thick are not sufficiently pliable.

The anode wire can have any desired cross-sectional outline, either round, oval, square, rectangular, polygonal, etc. For the spot welding it is preferred that the flattened portion be reduced to about the same thickness as the anode lead.

The resin seal of Fig. 1 can be improved by recessing the resin a small amount at the site where the lead 28 emerges from it. With leads having the relatively low twisting endurance of nickel or the like, such recessing relieves the stress concentration caused by the twisting at the lead emergence site and distributes the strains over a length corresponding to the depth of the recess. The preferred structure, however, results when a flexible tubing is placed over the terminal wire 28 and is partially embedded (30% to 50% of its length which is typically ³⁄₃₂" for a 14 mil diameter wire) in a resin seal 30. By avoiding stress concentration at the emergence site with a long vinyl plastic tube, lead breakage from normal bending of leads is completely eliminated.

For operation at potentials up to about 10 volts, the tantalum anode of the present invention provides a better capacitor than does the less expensive aluminum.

As many apparently widely different embodiments of this invention may be made without departing from the spirit and scope hereof, it is to be understood that the invention is not limited to the specific embodiments hereof except as defined in the appended claims.

What is claimed is:

1. In a miniature electrolytic capacitor having a capacitance measured in microfarads, a tubular silver can of the order of 1/8 inch in diameter, 1/2 inch in length and 6 mils in thickness, a straight tantalum anode axially positioned in said can composed of a wire of 10 to 50 mils in diameter, an etched surface on said straight wire anode providing an anode surface to said capacitor whereby said miniature capacitor has said capacitance, an electrolyte in said can occupying a volume substantially greater than the volume occupied by said tantalum wire anode and the anode assembly being sealed to the open end of the can by an insulating resin mass.

2. In a miniature electrolytic capacitor of a capacitance in microfarads, a tubular silver can of about 1/8 inch in diameter and no more than about 1/2 inch long with a wall thickness of not more than 6 mils, a section of straight tantalum wire axially positioned in said silver can having a diameter of from 10 to 50 mils, a surface on said section of straight wire provided with a character by etching whereby said miniature capacitor has said capacitance, a roughened cathode surface on the interior of said can to inhibit the formation of a cathode film and cooperate with said anode surface in providing said capacitance to said miniature capacitor, an electrolyte in said can occupying a volume substantially greater than the volume occupied by said tantalum wire anode, an end seal in the open end of the can sealing the open end of the can and insulating the cathode can from the tantalum anode embedded in the resin seal.

3. In a miniature electrolytic capacitor having a section of tantalum wire as an anode, a tubular silver can of the order of 1/8 inch in diameter and 1/2 inch in length, a section of straight tantalum wire axially positioned along the length of said can and of slightly shorter length than said can, a flattened portion of the tantalum adjacent the end of the tantalum at the open end of the can, wings in the flattened portion of the tantalum wire extending beyond the circumference of the main portion of the wire, a flexible wire lead, a plurality of closely spaced welds securing the wire lead to the tantalum section at the flattened portion of the tantalum wire, a flexible spacer on the tantalum wire adjacent the flattened portion and sheathing the welded joint and a resin seal in the open end of the can composed of an insulating resin mass surrounding the weld joint and sealing it to the open end of the can to strengthen the weld against the strains of the manipulation and insulate the can from the anode wire whereby the rim of the open end of the can is stiffened.

References Cited in the file of this patent

UNITED STATES PATENTS

| | | |
|---|---|---|
| 2,029,451 | Geel | Feb. 4, 1936 |
| 2,066,912 | Ruben | Jan. 5, 1937 |
| 2,113,126 | Baer | Apr. 5, 1938 |
| 2,290,163 | Brennan | July 21, 1942 |
| 2,368,688 | Taylor | Feb. 6, 1945 |
| 2,616,953 | Booe | Nov. 4, 1952 |
| 2,667,606 | Rood | Jan. 26, 1954 |
| 2,758,258 | Bliss | Aug. 7, 1956 |
| 2,841,771 | Dunleavey | July 1, 1958 |

FOREIGN PATENTS

| | | |
|---|---|---|
| 162,630 | Australia | July 1, 1954 |